United States Patent
Agombar et al.

(10) Patent No.: US 10,558,362 B2
(45) Date of Patent: Feb. 11, 2020

(54) CONTROLLING OPERATION OF A DATA STORAGE SYSTEM

(71) Applicant: INTERNATIONAL BUSINESS MACHINES CORPORATION, Armonk, NY (US)

(72) Inventors: John P. Agombar, Hampshire (GB); Ian Boden, Hampshire (GB); Alastair Cooper, Winchester (GB); Gordon D. Hutchison, Hants (GB)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 15/155,420

(22) Filed: May 16, 2016

(65) Prior Publication Data

US 2017/0329533 A1 Nov. 16, 2017

(51) Int. Cl.
*G06F 12/00* (2006.01)
*G06F 3/06* (2006.01)

(52) U.S. Cl.
CPC .......... *G06F 3/0605* (2013.01); *G06F 3/0649* (2013.01); *G06F 3/0685* (2013.01)

(58) Field of Classification Search
None
See application file for complete search history.

(56) References Cited

U.S. PATENT DOCUMENTS

| | | | | |
|---|---|---|---|---|
| 6,070,225 A * | 5/2000 | Cheung | ................. | G06F 3/0613 711/112 |
| 7,308,530 B1 * | 12/2007 | Armstrong | ............ | G06F 3/0611 711/112 |
| 8,244,975 B2 | 8/2012 | DeCenzo | | |
| 8,773,787 B1 | 7/2014 | Beker | | |
| 8,819,333 B2 | 8/2014 | Walls | | |
| 2011/0145489 A1 * | 6/2011 | Yu | ......................... | G06F 3/0613 711/103 |

(Continued)

OTHER PUBLICATIONS

Intel, "Cost-Effective Intelligent RAID with Embedded High Performance Flash", Intel® RAID SSD Cache Controller RCS25ZB040, When Faster Matters, Solution Brief, pp. 1-8, Copyright © 2013 Intel Corporation, https:1/www.google.co.in/url?sa=t&rct=j&q=&esrc=s&source=web&cd=9&cad=rja&uact=8&ved=0ahUKEwivrafHluDJAhUIH44KHbvnClwQFghMMAg&url=http%3A%2F%2Fwww.intelraid.com%2Ffiles%2FIntel-1106_RAID-Zia-Beach8-Page-v101.

(Continued)

*Primary Examiner* — Baboucarr Faal
(74) *Attorney, Agent, or Firm* — Robert D. Bean

(57) ABSTRACT

Operating a data storage system comprising a plurality of disk drives and a storage controller connected to the disk drives. A first subset and a second subset of the plurality of disk drives are operated as short stroked disk drives and non-short stroked disk drives, respectively. Priority storage spaces are defined including a high priority storage space, a moderate priority storage space, and a low priority storage space. Data is received including associated access rates for each portion of the data. One of the priority storage spaces is identified to store a portion of the data, based on the access rates for each portion of the data. Data accessed most frequently is stored in the high priority storage space, data accessed least frequently is stored in the low priority storage space, and the remaining data is stored in the moderate priority storage space.

15 Claims, 6 Drawing Sheets

| | Data Access | Storage Priority | Physical Location |
|---|---|---|---|
| Tier 1 | Most Accessed | High | Short Stroked |
| Tier 2 | Median Accessed | Medium | Normal Disk |
| Tier 3 | Least Accessed | Low | Non-Short Stroked |

(56) References Cited

U.S. PATENT DOCUMENTS

| | | | |
|---|---|---|---|
| 2012/0198152 A1* | 8/2012 | Terry | G06F 11/2094 |
| | | | 711/114 |
| 2012/0311292 A1* | 12/2012 | Maniwa | G06F 3/061 |
| | | | 711/170 |
| 2013/0185508 A1 | 7/2013 | Talagala et al. | |
| 2013/0312005 A1* | 11/2013 | Chiu | G06F 3/061 |
| | | | 718/105 |

OTHER PUBLICATIONS

Wikipedia, "Hard disk drive performance characteristics", From Wikipedia, the free encyclopedia, Printed on Apr. 25, 2016, pp. 1-8, http://en.wikipedia.org/wiki/Hard_disk_drive_performance_characteristics.

Schmid et al., "Accelerate Your Hard Drive by Short Stroking", Mar. 5, 2009, pp. 1-5, http://www.tomshardware.co.uk/short-stroking-hdd,review-31527-7.html.

Wong, "The Hard Disk Drive Short Stroke Guide Rev. 2.0", TECHARP, Mar. 10, 2015, p. 1-4, http://archive.techarp.com/showarticle5cdb.html?artno=691&pgno=0.

Harris, "EMC's Missing Petabytes: The Cost of Short Stroking", StorageMojo, Feb. 10, 2015, pp. 1-5, https://storagemojo.com/2015/02/10/emcs-missing-petabytes-the-cost-of-short-stroking/.

EMC2 Where Information Lives, "EMC Symmetrix DMX-4 Enterprise Flash Drives with Microsoft Exchange", White Paper, Applied Technology, Oct. 2008, pp. 1-18, http://uk.emc.com/collateral/software/white-papers/h5833-symm-enterprise-flash-ms-exchange-wp.pdf.

Chiappetta, "How to Partition Your Hard Drive to Optimize Performance", May 13, 2012, p. 1-5, http://www.pcworld.com/article/255224/how_to_partition_your_hard_drive_to_optimize_performance.html.

* cited by examiner

|        | Data Access     | Storage Priority | Physical Location   |
|--------|-----------------|------------------|---------------------|
| Tier 1 | Most Accessed   | High             | Short Stroked       |
| Tier 2 | Median Accessed | Medium           | Normal Disk         |
| Tier 3 | Least Accessed  | Low              | Non-Short Stroked   |

Figure 4

CONTROLLING OPERATION OF A DATA STORAGE SYSTEM

FIELD OF THE INVENTION

The present invention relates to a data storage system, a method of operating the data storage system and to a computer program product for controlling the operation of the data storage system.

SUMMARY

According to a first aspect of the present invention, there is provided a method of operating a data storage system comprising a plurality of disk drives and a storage controller connected to the disk drives, the method comprising operating a subset of the disk drives as short stroked disk drives, operating the remainder of the disk drives as non-short stroked disk drives, defining a percentage of the storage space of each disk drive of the short stroked subset of the disk drives to be short stroked, defining a highest priority storage space of the data storage system as the short stroked storage space of the disk drives of the short stroked subset of the disk drives, a low priority storage space of the data storage system as the storage space of the disk drives of the non-short stroked remainder of the disk drives and a medium priority storage space of the data storage system as the non-short stroked storage space of the disk drives of the short stroked subset of the disk drives, defining data to be stored in the disk drives into three tiers of data, a first tier defining the most accessed data, a second tier defining the next most accessed data and a third tier defining the least accessed data, and storing the first tier of data in the highest priority storage space, the second tier of data in the medium priority storage space and the third tier of data in the lowest priority storage space.

BRIEF DESCRIPTION OF THE DRAWINGS

FIG. 4 is a table of data tiers within data stored by the data storage system, in accordance with an embodiment of the present invention;

DETAILED DESCRIPTION

Figure 1:
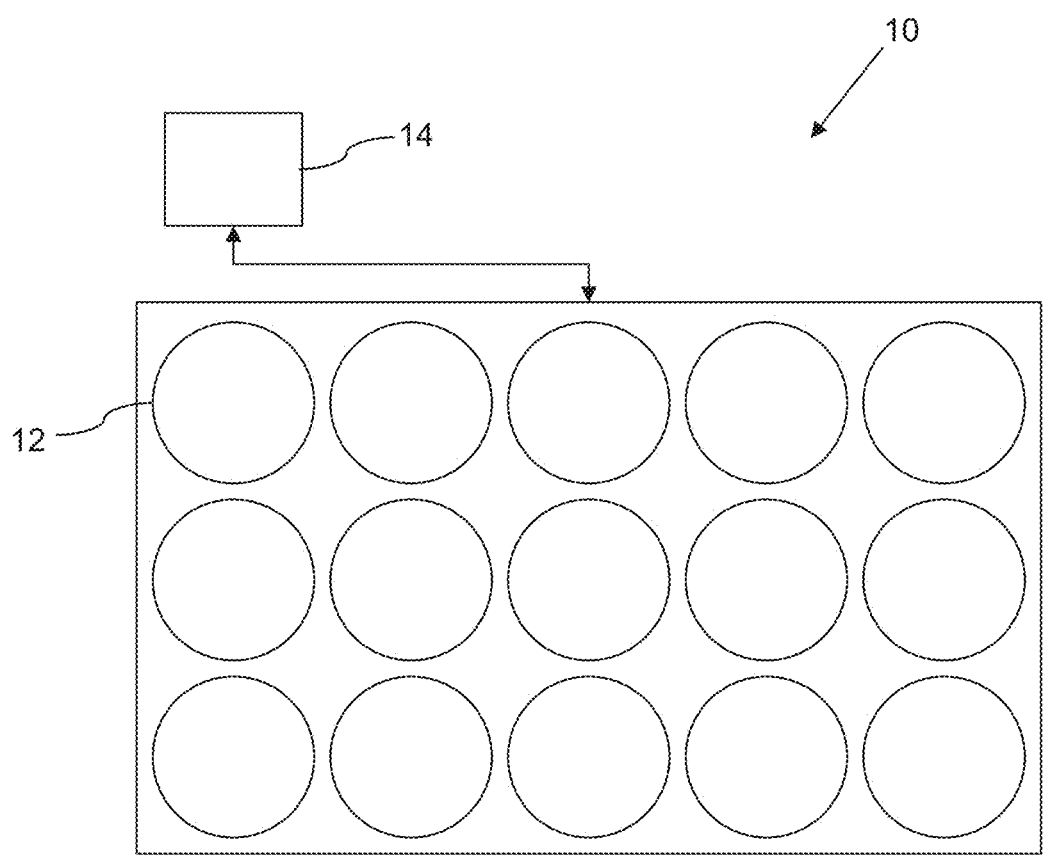
FIG. 1 is a block diagram illustrating a data storage system, in accordance with an embodiment of the present invention.

FIG. 1 is a block diagram illustrating a data storage system 10, in accordance with an embodiment of the present invention. In this embodiment, data storage system 10 includes a plurality of disk drives 12 and a storage controller 14 that is connected to the disk drives 12. Each disk drive 12 is shown schematically as a spinning disk, but each individual disk drive 12 may comprise a stack of spinning disks as a single hardware component. The disk drives 12 are shown in an array of rows and columns, but this is an exemplary arrangement of the disk drives 12 and the actual physical arrangement of the disk drives 12 may be different. Each disk drive 12 is capable of storing a large amount of data. For example, disk drives 12 include 4 and 6 terabyte (TB) storage devices being used in the data storage system 10.

The storage controller 14 is shown as a single component, for ease of understanding, but may in fact include of a set of distributed components that perform the function of the storage controller 14. The primary purpose of the storage controller 14 is to read and write data to and from the disk drives 12, while ensuring that the necessary storage metrics (e.g., data latency and input/output actions per second) are monitored. Data storage system 10 may perform the storage function of an enterprise (e.g., an International bank). In another example, the array of disk drives 12 could also be part of a data center.

The disk drives 12 are arranged in a Redundant Array of Inexpensive Disks (RAID) standard, which is a defined storage standard that defines such elements as redundancy in the data stored, in order to protect against the failure of individual disk drives 12. For example, following any failure of an individual disk drive 12, a RAID standard for disk drives 12 will ensure that data is not lost and can be recovered quickly. RAID defines various levels, such as RAID 1, RAID 2, etc. The various levels implemented in the RAID standard define a manner in which redundancy should be structured, based various factors, such as speed of access, speed of recovery following failure, etc. Each RAID level provides a different trade-offs between the goals of reliability, availability, performance, and capacity.

Figure 2:
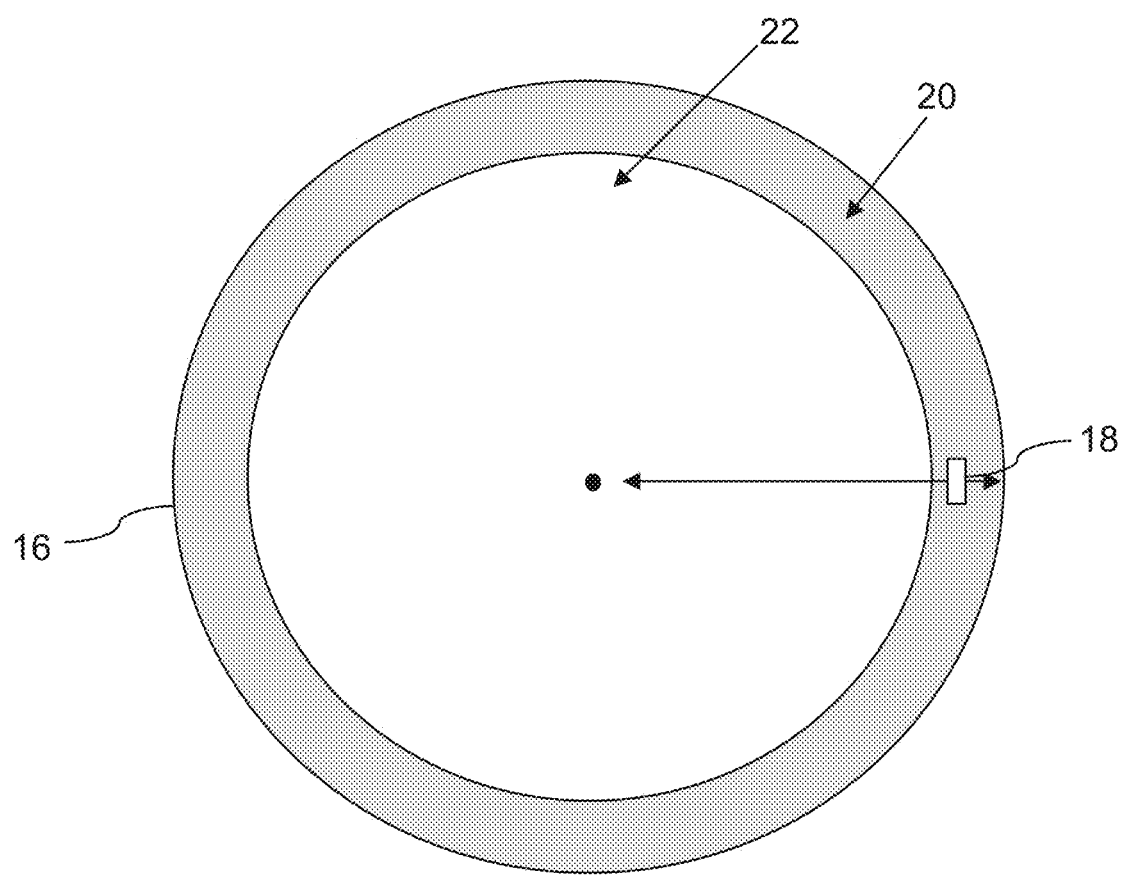
FIG. 2 is a block diagram illustrating a short stroked disk drive of the data storage system, in accordance with an embodiment of the present invention.

FIG. 2 is a block diagram illustrating a short stroked disk drive of the data storage system 10, in accordance with an embodiment of the present invention. In this embodiment, FIG. 2 illustrates the concept of short stroking with respect to a single disk drive 12 as depicted in FIG. 1. The physical disk 16 rotates about a center point, and stores data magnetically. Data is written to and read from the disk 16 by a head 18, which moves in a radial direction to and from the center point. In one example, the operation of the disk 16 and head 18 can be analogous to a vinyl record, such that a needle contacting the vinyl record can read data written on the vinyl record.

In a disk drive 12 that is non-short stroked, the head 18 is free to move across the entire radius of the spinning disk 16 (i.e., in a radial direction), with the entire storage capacity of the disk drive 12 being used within the data storage system 10. In one embodiment, the entirety of the magnetic disk 16 is used to store data. In this embodiment, disk 16 is short stroked, which means that only a portion of the disk 16 is available to be used for the storage of data. The shaded band 20 is the short stroked portion of the disk 16. In this embodiment, short stroking the disk 16, where the disk drive 12 of FIG. 1 contains the disk 16, reduces an amount of movement required by the head 18.

In this embodiment, short stroked disk 16 has a faster response time on average for measurable data storage metrics such as speed of data access, compared to a non-short stroked disk drive. The amount of available space within the disk 16 is reduced, since the non-short stroked space 22 within the disk 16 is not used. In one embodiment, an optimal location for the short stroked portion 20 can be on the outside of the disk 16. For example, compared to a portion located closer to the center of disk 16, the amount of space available for movement by the head 18 is increased and the disk 16 relative to the head 18 has a faster linear velocity.

Figure 3:
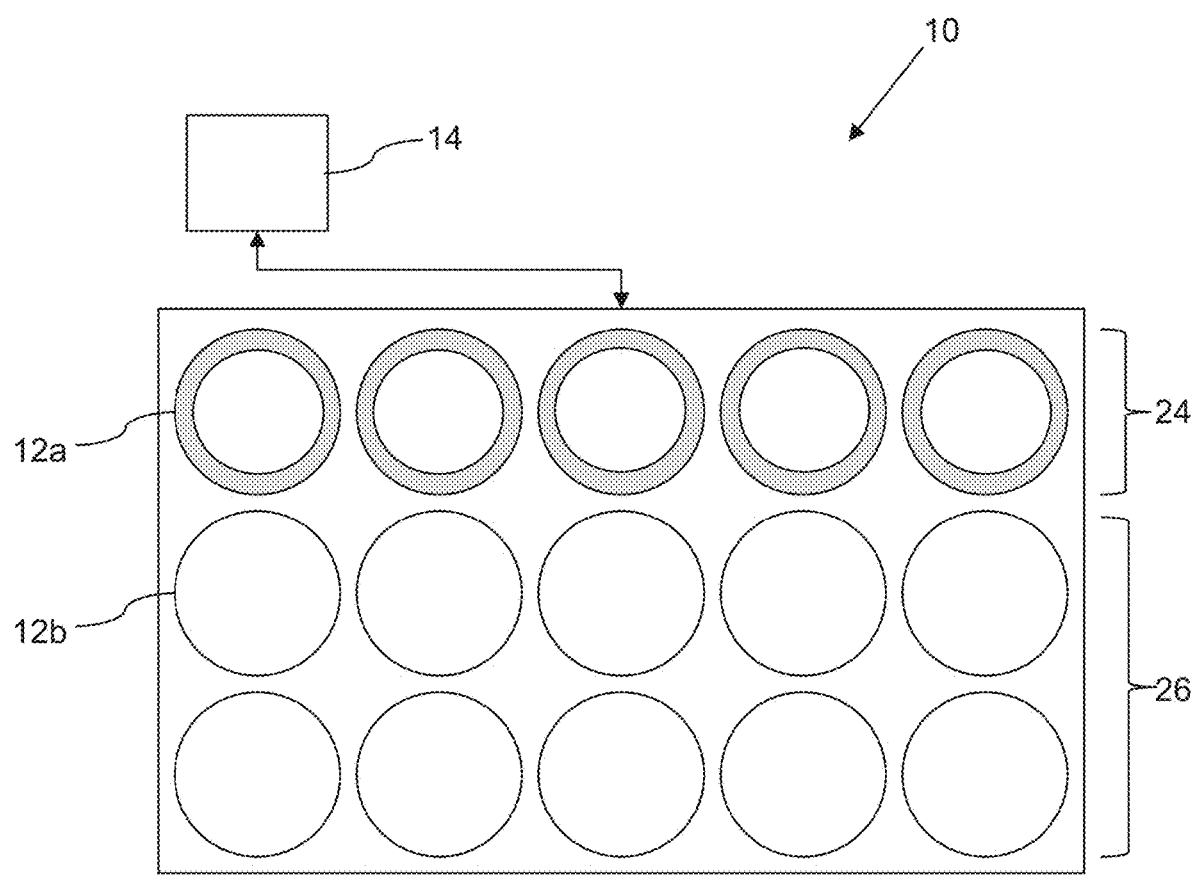
FIG. 3 is a block diagram illustrating the data storage system, in accordance with an embodiment of the present invention.

FIG. 3 is a block diagram illustrating the data storage system 10, in accordance with an embodiment of the present invention. In this embodiment, disk drives 12, as described in FIG. 1, is split into two subsets. A first subset 24 including disk drives 12*a* are operated as short stroked disk drives, and a second subset 26 including disk drives 12*b* are operated as non-short stroked disk drives. The storage controller 14 determines the how each of disk drives 12 are split between disk drives 12*a* and disk drives 12*b*, as well as percentage of disk drives 12*a* that form the short stroked portion 20, as illustrated in FIG. 2.

In one embodiment, a decision to short stroke a portion of the disk drives 12 of the data storage system 10 can create three different storage areas within the overall data storage system 10. The first area, which can be considered the highest priority storage area, is the short stroked portion 20, as described in FIG. 2, of the short stroked disk drives 12*a*. The second area, which can be considered the medium priority storage area, is the non-short stroked disk drives 12*b*. The third area, which can be considered the lowest priority area, is the non-short stroked area 22, as described in FIG. 2, of the short stroked disk drives 12*a*. These three areas will have different storage performances, such as speed of response.

Those disk drives 12*a* that are short stroked do not differ physically from those disk drives 12*b* that are not short stroked. It should be understood that, any one of disk drives 12 can be moved from the first subset 24 to the second subset 26 and vice versa, at any time. The categorization of each disk drive 12 as short stroked, or not, is maintained by the storage controller 14 as a logical categorization of the each of the disk drives 12. The storage controller 14 also maintains information regarding the size of short stroked portion 20 for each short stroked disk drives 12*a*.

FIG. 4 is a table of data tiers within data stored by the data storage system 10, in accordance with an embodiment of the present invention. In this embodiment, the storage system 10 can be tiered into three tiers of data, with the tiers matching the storage priorities of the three different priorities of the storage areas. In general, data being stored within a data storage system 10, such as that shown in FIG. 3, will not be accessed in a uniform manner. Certain data areas will be accessed, either as a read or write, more frequently compared to other data areas. Certain data areas can be more frequently accessed due to behavior of users, characteristics of workloads, and characteristics of data being stored by the data storage system 10.

Hot areas are identified as data areas that are accessed on a more frequently compared to other data areas. All of the data being stored can therefore be split into three tiers, or one of thee portions of data, defined (or identified), by most accessed, median accessed and least accessed. This information about the level of access is either predefined or is constructed in real time as data is actually accessed. The boundaries between the tiers are arbitrary and can be moved according to the end result that is trying to be achieved. The tier boundaries can be set in terms of the amount of access or can be set in terms of the percentage of data that is to be contained within each tier.

For example, 10% of data can be defined as tier 1, the most accessed data, 20% of data can be defined as tier 2, the median accessed data and the remaining 70% of data can be defined as tier 3, the least accessed data. The lowest tier also includes any empty space within the data storage system 10, as it is highly unlikely in practical terms that the entirety of the data storage available is actually in use. The table in FIG. 4 illustrates the different tiers, how the storage priority is assigned to each tier and the practical implication of the where the different tiers are stored within the data storage system 10.

Figure 5:
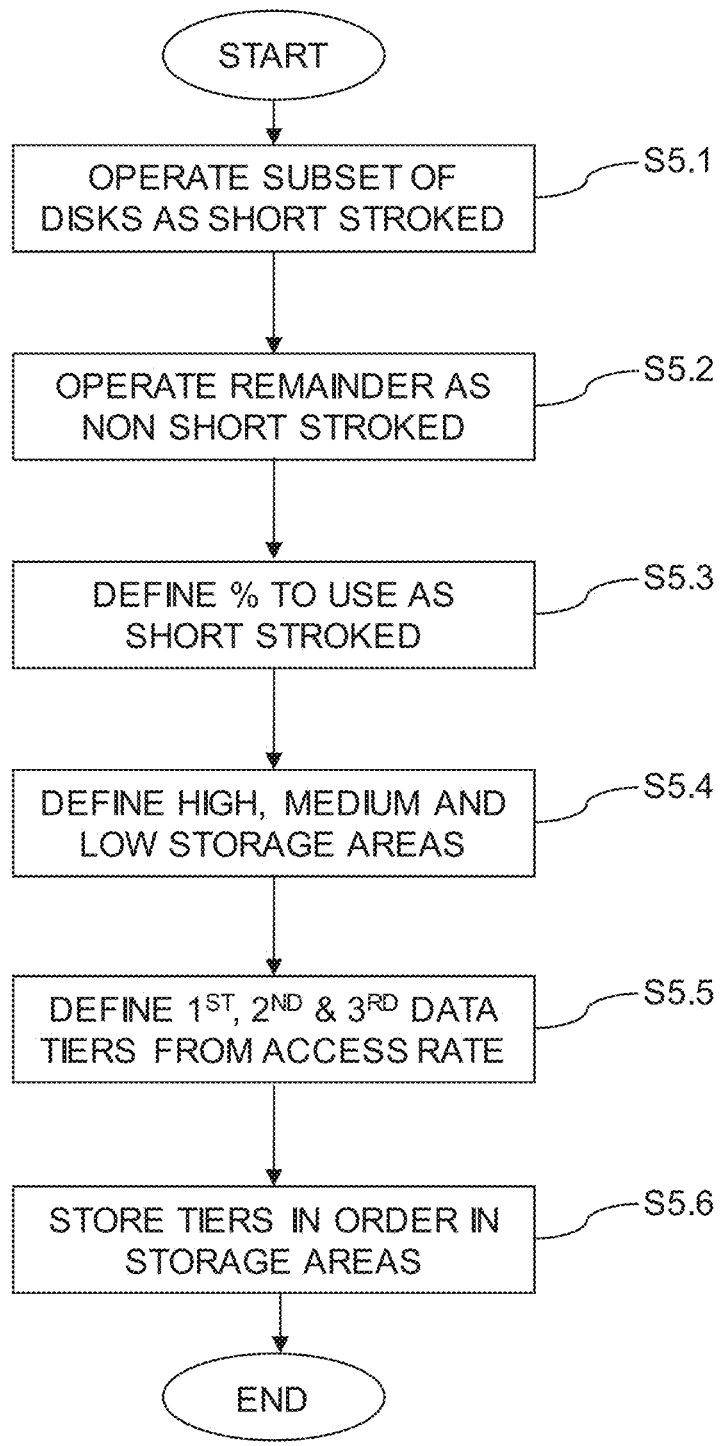
FIG. 5 is a flowchart illustrating a method of operating the data storage system, in accordance with an embodiment of the present invention.

FIG. 5 is a flowchart illustrating a method of operating the data storage system 10, in accordance with an embodiment of the present invention. In this embodiment, the method presented in FIG. 5 is executed by the storage controller 14. In step S5.1, storage controller 14 operates the first subset 24 of the disk drives 12 as short stroked disk drives 12*a*. In step S5.2, storage controller 14*b* operates the remaining portion of the disk drives 12 as non-short stroked disk drives 12*b*. In step S5.3, storage controller 14 defines a percentage of the storage space of each disk drive 12*a* of the first subset 24 to be short stroked.

In step S5.4, storage controller 14 defines a highest priority storage space of the data storage system 10 as the short stroked storage space 20 of the disk drives 12*a* of the first subset 24 of the disk drives 12, a medium priority storage space of the data storage system 10 as the storage space of the disk drives 12*b* of the second subset 26 and a lowest priority storage space of the data storage system 10 as the non-short stroked storage space 22 of the disk drives 12*a* of the first subset 24. As previously described, the storage controller 14 operates a hierarchy of the three different storage spaces that are created as a result of short stroking a subset 24 of the overall disk drives 12.

In step S5.5, storage controller 14 defines data to be stored in the disk drives 12 into three tiers of data, such that a first tier defining the most accessed data, a second tier defining the next most accessed data, and a third tier defining the least accessed data. In step S5.6, storage controller 14 stores the first tier of data in the highest priority storage space, the second tier of data in the medium priority storage space, and the third tier of data in the lowest priority storage space. In this manner as described, the data to be stored is split into three tiers that define a rate of access hierarchy and the data in the tiers are stored in the respective different priority storage areas.

In another embodiment, the storage controller 14 can also be further arranged to monitor the access rates of read and write accesses to the data stored in the data storage system and periodically adjust the data defined as associated with each tier of the three tiers of data. The storage controller 14 performs auto-tiering, such that the three tiers of data are continually updated, so that if one area of data starts to become accessed more frequently, whether as a read or write, then the tiers can be updated to reflect this change. For example, data that becomes "hot" will be moved to the highest tier of data and this will result in the particular data that has been accessed being stored in the highest priority storage space.

In another embodiment, the storage controller 14 can also dynamically adjust the number of disk drives 12 that are short stroked and can also dynamically adjust the percentage of storage areas for which those disk drives 12 are short stroked. The storage controller 14 reads a predefined access rate threshold and when defining the data to be stored in the first tier, which defines the most accessed data, will define all data with an access rated above the predefined read access rate threshold as associated with the first tier. The access rate threshold can be expressed in terms of Input/Output (I/Os) per second and any data, viewed at a predetermined level of granularity, which is accessed more often than the threshold is considered to be "hot" and therefore placed in the first tier.

The storage controller 14 then monitors the amount of data defined as associated with the first tier and adjusts the size of the subset 24 defined as short stroked disk drives 12a and/or adjusts the size of the percentage of the storage space 20 of each disk drive 12a to be short stroked to match the amount of data defined as associated with the first tier. The amount of data that is within the first tier is flexible, since this depends on the actual access rates of data stored within the data storage system 10, and the amount of priority storage space can be adjusted to match the size of the first tier of data.

This ensures that the provision of the short stroked disk space 20 is kept to a size that closely matches the actual amount of data defined as associated with the first tier. For example, in a data store system 10 that stores 100 TB of data, the threshold that determines whether data is in the first tier may be set such that at configuration 5 TB of data is defined as associated with the first tier. The number of disk drives 12 to be short stroked and the amount of short stroking to be used in each drive 12 is then set accordingly. Five disk drives 12 may be short stroked and the percentage of each drive 12 that is short stoked is such that 1 TB of each drive 12 is available to tier 1.

Later, it may be determined by the storage controller 14 that the access rates over the data have decreased and only 4 TB of data are now considered to associate with the first tier of data. In this instance, the storage controller 14 will respond, either by reducing the number of disk drives 12 that are short stroked or by reducing the amount of short stroking in each individual disk drive 12. In general matching as close as possible is desirable, as if not enough short stroking is available, data in the first tier will be stored in the medium priority storage space provided at slower than ideal access speeds for that data and if too much short stroking is used then data in the first tier will be provided at slower than necessary access speeds, since the heads 18 of the disk drives 12 will on average be travelling further than necessary, since the short stoked portion 20 is larger than needed.

Figure 6:
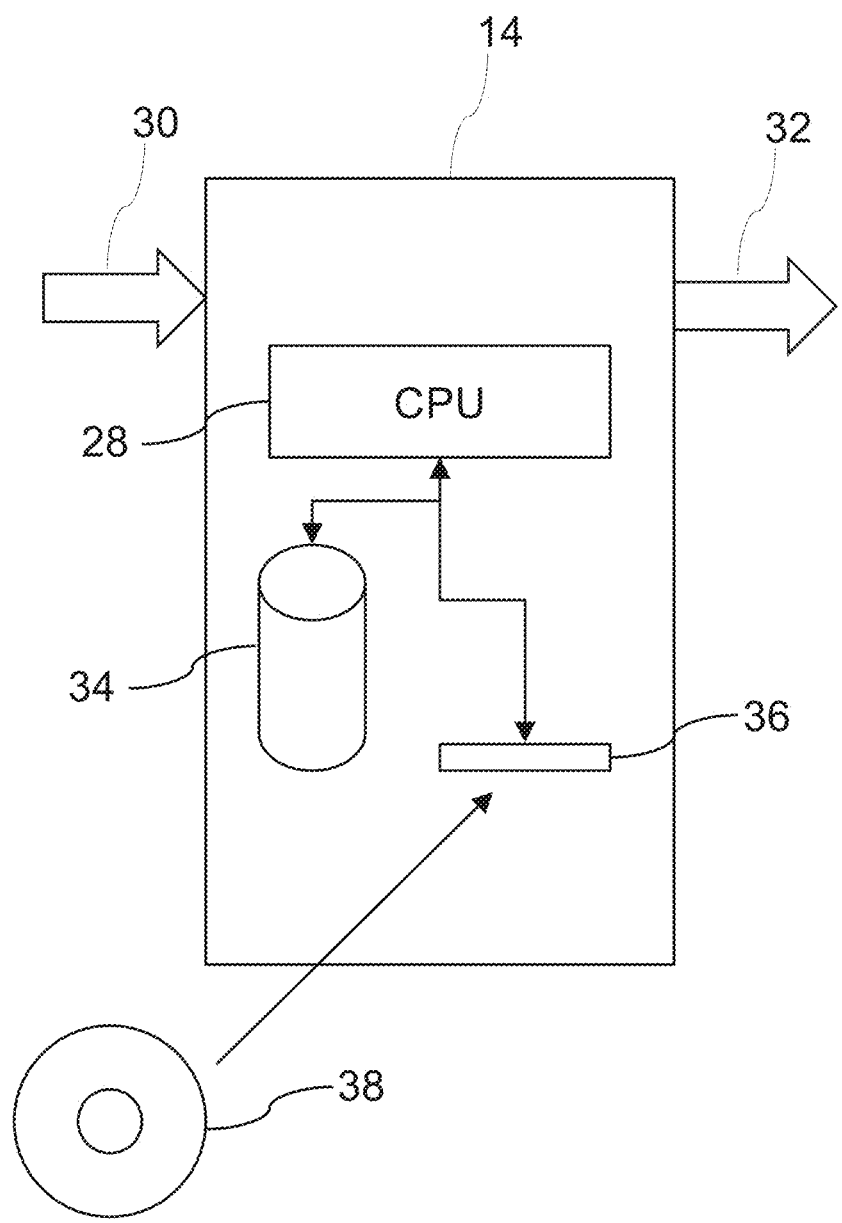
FIG. 6 is a schematic diagram of a storage controller of the data storage system, in accordance with an embodiment of the present invention.

FIG. 6 is a schematic diagram of the storage controller 14 of the data storage system 10, in accordance with an embodiment of the present invention. The storage controller 14 comprises a processor 28 that is connected to an input connection 30, which receives read and write requests, and an output connection 32, which is connected to the disk drives 12, as previously described. The processor 28 of the storage controller 14 is also connected to a local storage device 34, which stores information about the tiering and storage priorities, and to a local interface 36. A computer readable storage medium 38 is provided, which is a CD-ROM storing a computer program product that can be used to control the processor 28 to operate the storage controller 14. The processor 28 executes instructions from the computer program product to operate the controller 14.

The data stored in the disk drives 12 is virtualized by the storage controller 14 into different "mdisks", where an mdisk is logical "managed disk" that can be considered as a single storage entity in logical form only since the actual physical storage hardware will comprise multiple components. The storage controller 14 is connected to the large de-clustered array made from commodity disk drives 12. The storage controller 14 short strokes a small percentage of the disk drives 12 and exports this space as a virtual faster mdisk. The storage controller 14 can also, for this area, use more spindles per strip than the rest of the array to increase bandwidth.

This smaller faster mdisk also gets extra internal resources if desired such as cache affinity. This smaller faster mdisk is given faster performance statistics in the information that is passed to a tiering function within the storage controller 14 to allow tiering to move hot data in the array to this area of the drives 12. This faster performance data can match what will be experienced when the short stroking is in operation and the disk drives 12a are strictly being short stroked. The main body of the array is placed in a storage pool using another mdisk, this mdisk is given the normal performance statistics in the data that is given to tiering function.

For the space that would have typically be unused in the short stroked drives 12a, the storage controller 14 uses two techniques utilize this space, which makes the fact that the storage controller 14 is doing short stroking invisible to the user. The storage controller 14 designates the unused "dark" space on the drives 12a that are short stroked with a third mdisk and requests that the allocation of capacity within the array is made on this mdisk last. In general all storage arrays have safety space, which is capacity that is not likely to be used in most set ups. The storage controller 14 gives this third mdisk expected performance statistics in the tiering that are artificially below those in the rest of the system and lets the tiering function migrate data that is seldom accessed to this mdisk, so that even if the array is completely full, the hot area is not disturbed from its short stroking.

The storage controller 14 can also adapt to the workload that is sent to the storage array. If the whole storage array was in one "pool" of user data, the storage controller 14 could designate the data on the underlying RAID arrays with different mdisk addresses as long as all necessary maps are updated. This allows the run time repartitioning of the storage of the array into different mdisks as long as these remain in the same pool. For example, if the array observed that 5% of the storage area was accessed 25% of the time but the pool was only 70% full, then it would be possible to select 20% of the drives and short stroke them to the outer 25% of the tracks but first migrating data off of the lowest priority area, re-designating the remaining area of the short-stroked drives, sending the new mdisk performance spec data to the tiering function and then creating a new low priority mdisk with a slow profile.

Either by default, from policy, user choice or the storage controller 14 observing what percentage of stored data is "hot" and how much free (or cold) space is in the array the storage controller 14 arrives at how many drives to short stroke and to what percentage of their platter surface does the storage controller 14 want to restrict hot data. Drives are selected to short stroke and these drives ids are stored for the array. These drives have the logical block address (lba) range divided up into "hot" and "cold" areas and the boundary lba is stored for the array. The storage controller 14 provisions two mdisks to the system as detailed above, one as mdisk-hot and one as mdisk-cold. For IOs of the form {mdisk-cold, lba} the storage controller 14 adds the boundary-lba to the lba value and maps the mdisk-cold to the correct drive using a suitable function and lba and the hot-lbas-per-hot-drive and the set of hot drive IDs are stored in a fixed order. The RAID system sets a marker on the cold mdisk in order that it is used last.

The tiering function maintained by the storage controller 14 is given something like the following stats: hot-mdisk: rpm=200% real-rpm, main-mdisk: rpm=100% real-rpm and cold-mdisk: rpm=10% real-rpm. In this way the tiering that is performed will send the hot data to the hot-mdisk since this storage area will be perceived to have higher performance stats and the least accessed data will be sent to the cold-mdisk since this storage area will have the lowest performance stats.

Effectively, the storage controller 14 is arranged to define an artificially higher storage performance for the highest priority storage space relative to the medium priority storage space and define an artificially lower storage performance for the lowest priority storage space relative to the medium priority storage space. When the storage controller 14 is storing of the first tier of data in the highest priority storage space, the second tier of data in the medium priority storage space and the third tier of data in the lowest priority storage space, this storing is performed according to the defined storage performance for the respective priority storage spaces. The tiering function is driven by the storage performance statistics, which have been artificially generated for the different priority storage areas, but this ensures that the "hot" data is sent to the highest priority storage space and the "cold" data is sent to the lowest priority storage space.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for operating a data storage system comprising a plurality of disk drives and a storage controller connected to the plurality of disk drives, the method comprising:
   operating, by the storage controller, a first number of the plurality of disk drives as short stroked disk drives;
   operating, by the storage controller, a second number of the plurality of disk drives as non-short stroked disk drives;
   altering, by the storage controller, the first number of short-stroked disk drives in response to one or more access rates of a plurality of data;
   altering, by the storage controller, a size of a short-stroked region of one or more short-stroked disk drives in response to the one or more access rates of the plurality of data;
   defining, by the storage controller, priority storage spaces including a high priority storage space that is a portion in each of the short stroked disk drives, a low priority storage space that is the remaining portion in each of the short stroked disk drives, and a moderate priority storage space that is an entire portion of each non-short stroked disk drives;
   receiving, by the storage controller, data for storing in the plurality of disk drives, including the access rates for each portion of the data;
   identifying, by the storage controller, one of the priority storage spaces to store a portion of the data, based on the access rates for each portion of the data; and
   storing, by the storage controller, a first portion of the data, accessed most frequently, in the high priority storage space, a second portion of the data, accessed least frequently, in the low priority storage space, and a third portion of the data, accessed more frequently than the second portion of the data and less frequently than the first portion of the data, in the moderate priority storage space.

2. The method of claim 1, further comprising:
   monitoring, by the storage controller, the access rates of read and write accesses to each portion of the data stored in the data storage system; and
   periodically identifying, by the storage controller, one of the priority storage spaces to store each portion of the data.

3. The method of claim 1, further comprising:
   reading, by the storage controller, a predefined access rate threshold.

4. The method of claim 3, wherein identifying one of the priority spaces to store a portion of the data comprises:
   identifying, by the storage controller, one or more portions of the data associated with an access rate greater than the predefined access rate threshold.

5. The method of claim 1, further comprising:
   defining, by the storage controller, an artificially higher storage performance for the high priority storage space relative to the medium priority storage space; and
   defining, by the storage controller, an artificially lower storage performance for the lowest priority storage space relative to the medium priority storage space, wherein storing the first portion of the data in the high priority storage space, the second portion of the data in the low priority storage space, and the third portion of the data in the moderate priority storage space, are based on the defined storage performance for each of the priority storage spaces.

6. A computer program product for operating a data storage system comprising a plurality of disk drives and a storage controller connected to the plurality of disk drives, the computer program product comprising:
   one or more computer readable storage media and program instructions stored on the one or more computer readable storage media, the program instructions comprising:
   program instructions to operate a first number of the plurality of disk drives as short stroked disk drives;
   program instructions to operate a second number of the plurality of disk drives as non-short stroked disk drives;
   program instructions to alter the first number of short-stroked disk drives in response to one or more access rates of a plurality of data;
   program instructions to alter a size of a short-stroked region of one or more short-stroked disk drives in response to the one or more access rates of the plurality of data;
   program instructions to define priority storage spaces including a high priority storage space that is a portion in each of the short stroked disk drives, a low priority storage space that is the remaining portion in each of the short stroked disk drives, and a moderate priority storage space that is an entire portion of each non-short stroked disk drives;
   program instructions to receive data for storing in the plurality of disk drives, including the access rates for each portion of the data;
   program instructions to identify one of the priority storage spaces to store a portion of the data, based on the access rates for each portion of the data; and
   program instructions to store a first portion of the data, accessed most frequently, in the high priority storage space, a second portion of the data, accessed least frequently, in the low priority storage space, and a third portion of the data, accessed more frequently than the second portion of the data and less frequently than the first portion of the data, in the moderate priority storage space.

7. The computer program product of claim 6, wherein the program instructions stored on the one or more computer readable storage media further comprise:
   program instructions to monitor the access rates of read and write accesses to each portion of the data stored in the data storage system; and
   program instructions to periodically identify one of the priority storage spaces to store each portion of the data.

8. The computer program product of claim 6, wherein the program instructions stored on the one or more computer readable storage media further comprise:
   program instructions to read a predefined access rate threshold.

9. The computer program product of claim 8, wherein program instructions to identify one of the priority spaces to store a portion of the data comprise:
program instructions to identify one or more portions of the data associated with an access rate greater than the predefined access rate threshold.

10. The computer program product of claim 6, wherein the program instructions stored on the one or more computer readable storage media further comprise:
program instructions to define an artificially higher storage performance for the high priority storage space relative to the medium priority storage space; and
program instructions to define an artificially lower storage performance for the lowest priority storage space relative to the medium priority storage space, wherein storing the first portion of the data in the high priority storage space, the second portion of the data in the low priority storage space, and the third portion of the data in the moderate priority storage space, are based on the defined storage performance for each of the priority storage spaces.

11. A data storage system, the data storage system comprising:
a storage controller; a plurality of disk drives connected to and controlled by the storage controller; the storage controller operated to:
operate a first number of the plurality of disk drives as short stroked disk drives;
operate a second number of the plurality of disk drives as non-short stroked disk drives;
alter the first number of short-stroked disk drives in response to one or more access rates of a plurality of data;
alter a size of a short-stroked region of one or more short-stroked disk drives in response to the one or more access rates of the plurality of data;
define priority storage spaces including a high priority storage space that is a portion in each of the short stroked disk drives, a low priority storage space that is the remaining portion in each of the short stroked disk drives, and a moderate priority storage space that is an entire portion of each non-short stroked disk drives;
receive data for storing in the plurality of disk drives, including the access rates for each portion of the data;
identify one of the priority storage spaces to store a portion of the data, based on the access rates for each portion of the data; and
store a first portion of the data, accessed most frequently, in the high priority storage space, a second portion of the data, accessed least frequently, in the low priority storage space, and a third portion of the data, accessed more frequently than the second portion of the data and less frequently than the first portion of the data, in the moderate priority storage space.

12. The data storage system of claim 11, further comprising:
the storage controller operated to:
monitor the access rates of read and write accesses to each portion of the data stored in the data storage system; and
periodically identify one of the priority storage spaces to store each portion of the data.

13. The data storage system of claim 11, further comprising:
the storage controller operated to:
read a predefined access rate threshold.

14. The data storage system of claim 13, wherein the storage controller operated to identify one of the priority spaces to store a portion of the data comprise:
the storage controller operated to:
identify one or more portions of the data associated with an access rate greater than the predefined access rate threshold.

15. The data storage system of claim 11, further comprising:
the storage controller operated to:
define an artificially higher storage performance for the high priority storage space relative to the medium priority storage space; and
define an artificially lower storage performance for the lowest priority storage space relative to the medium priority storage space, wherein storing the first portion of the data in the high priority storage space, the second portion of the data in the low priority storage space, and the third portion of the data in the moderate priority storage space, are based on the defined storage performance for each of the priority storage spaces.

* * * * *